US008542174B2

(12) United States Patent
Chang et al.

(10) Patent No.: US 8,542,174 B2
(45) Date of Patent: Sep. 24, 2013

(54) DISPLAY PANEL AND DRIVING METHOD THEREOF

(75) Inventors: Che-Chih Chang, Toufen Township, Miaoli County (TW); Chi-Mao Hung, Chiayi (TW)

(73) Assignee: Au Optronics Corp., Hsinchu (TW)

( * ) Notice: Subject to any disclaimer, the term of this patent is extended or adjusted under 35 U.S.C. 154(b) by 360 days.

(21) Appl. No.: 13/009,604

(22) Filed: Jan. 19, 2011

(65) Prior Publication Data

US 2011/0109603 A1 May 12, 2011

Related U.S. Application Data

(62) Division of application No. 11/380,669, filed on Apr. 28, 2006, now Pat. No. 7,893,911.

(30) Foreign Application Priority Data

May 16, 2005 (TW) .............................. 94115752 A

(51) Int. Cl.
*G09G 3/36* (2006.01)
*G09G 5/00* (2006.01)
*G06F 3/038* (2013.01)

(52) U.S. Cl.
USPC ................ 345/98; 345/99; 345/204; 345/214

(58) Field of Classification Search
USPC .................... 345/87–104, 204–215, 690–699
See application file for complete search history.

(56) References Cited

U.S. PATENT DOCUMENTS

| | | | | |
|---|---|---|---|---|
| 4,363,976 | A | 12/1982 | Minor | |
| 4,825,203 | A | 4/1989 | Takeda et al. | |
| 5,021,774 | A | 6/1991 | Ohwada et al. | |
| 5,170,158 | A | 12/1992 | Shinya | |
| 5,619,225 | A | 4/1997 | Hashimoto | |
| 5,731,794 | A | 3/1998 | Miyazawa | |
| 6,072,457 | A * | 6/2000 | Hashimoto et al. | 345/100 |
| 6,181,313 | B1 | 1/2001 | Yokota et al. | |
| 6,266,038 | B1 | 7/2001 | Yoshida et al. | |
| 6,295,043 | B1 | 9/2001 | Hashimoto et al. | |
| 6,333,729 | B1 | 12/2001 | Ha | |
| 6,822,645 | B2 | 11/2004 | Noritake et al. | |
| 7,154,461 | B2 | 12/2006 | Lin et al. | |
| 7,190,341 | B2 | 3/2007 | Yu | |
| 7,342,559 | B2 * | 3/2008 | Shin | 345/76 |
| 7,502,019 | B2 * | 3/2009 | Shin | 345/211 |

(Continued)

FOREIGN PATENT DOCUMENTS

| | | |
|---|---|---|
| CN | 1118469 | 3/1996 |
| CN | 1346123 | 4/2002 |

(Continued)

*Primary Examiner* — Alexander Eisen
*Assistant Examiner* — Patrick F Marinelli
(74) *Attorney, Agent, or Firm* — McClure, Qualey & Rodack, LLP

(57) ABSTRACT

Display panels buffering display data from a data driver. The display panel comprises a first signal line, a first data line, a first scan line interlaced with the first data line, a first pixel coupled to the first data line and the first scan line, a first switching element comprising a first terminal coupled to the first data line, a first storage capacitor coupled between a second terminal of the first switching element and a ground, and a second switching element coupled to the first storage capacitor and the first signal line.

6 Claims, 8 Drawing Sheets

(56) References Cited

U.S. PATENT DOCUMENTS

| | | | | |
|---|---|---|---|---|
| 7,893,911 | B2 * | 2/2011 | Chang et al. | 345/98 |
| 2002/0167343 | A1 * | 11/2002 | Erhart et al. | 327/94 |
| 2003/0090451 | A1 * | 5/2003 | Ahn | 345/96 |
| 2004/0032216 | A1 | 2/2004 | Choi | |
| 2004/0125067 | A1 * | 7/2004 | Kim et al. | 345/98 |
| 2005/0073483 | A1 | 4/2005 | Lee et al. | |
| 2006/0256061 | A1 * | 11/2006 | Chang et al. | 345/98 |
| 2011/0037737 | A1 * | 2/2011 | Chang et al. | 345/204 |

FOREIGN PATENT DOCUMENTS

| | | |
|---|---|---|
| EP | 0 686 960 | 12/1995 |
| JP | 08006528 | 1/1996 |
| TW | 594657 | 6/2004 |
| TW | 226482 | 1/2005 |

* cited by examiner

DISPLAY PANEL AND DRIVING METHOD THEREOF

CROSS REFERENCE TO RELATED APPLICATIONS

This application is a divisional of application Ser. No. 11/380,669, filed Apr. 28, 2006, now U.S. Pat. No. 7,893,911, which claims priority to Taiwanese Application No. 94115752, filed May 16, 2005, the entireties of which are incorporated herein.

BACKGROUND OF THE INVENTION

1. Field of the Invention

The invention relates to display panels, and in particular relates to display panels capable of buffering display data from a data driver.

2. Description of the Related Art

FIG. 1A shows a conventional display panel, and FIG. 1B shows a timing chart thereof. As shown, the conventional display panel comprises K scan lines G1~GK, N data lines DL1~DLN, a plurality of pixels P11~PNK, a scan driver and a data driver. The scan driver scans the scan lines G1~GK in sequence, such that pixels P11~PNK can be driven by display data on the data lines DLF~DLN from the data driver. For example, display data on the data line DLF~DLN from the data driver drives the pixels P11~PN1 connected to the scan line G1 when the scan line G1 is scanned by the scan driver. Similarly, display data on the data line DL1~DLN from the data driver drives the pixels P12~PN2 connected to the scan line G2 when the scan line G2 is scanned by the scan driver, and so on. Display data on the data line DL1~DLN from the data driver drives the pixels P1K~PNK connected to the scan line GN when the scan line GN is scanned by the scan driver.

Generally, the data driver comprises a plurality of driving integrated circuits (ICs) corresponding to the data lines DL1~DLK, each driving a predetermined number of data lines. As data lines increase, more driving ICs are required as are flexible printed circuit (FPC) boards for the driving ICs are increased. Thus, time spent bonding the driving ICs to the FPC board and the FPC board to the display panel is increased during fabrication.

BRIEF SUMMARY OF THE INVENTION

A detailed description is given in the following embodiments with reference to the accompanying drawings.

Embodiments of display panels are disclosed. The display panel comprises a first signal line, a first data line, a first scan line interlaced with the first data line, a first pixel coupled to the first data line and the first scan line, a first switching element comprising a first terminal coupled to the first data line, a first storage capacitor coupled between a second terminal of the first switching element and a ground, and a second switching element coupled to the first storage capacitor and the first signal line.

The invention also provides driving methods for a display panel, comprising providing driving voltages thereof, in which a first set of data stored in N first storage capacitors in an M−1$^{th}$ period is transferred to N corresponding first pixels through N data lines, driving the same, and a second set of data on a second data line from a data driver is stored to N second storage capacitors, during an M$^{th}$ period. The second set of data stored in the N second storage capacitors is transferred to N corresponding second pixels through the N data lines, driving the same, and a third set of data on a first data line from the data driver is stored to the N first storage capacitors, during an M+1$^{th}$ period.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
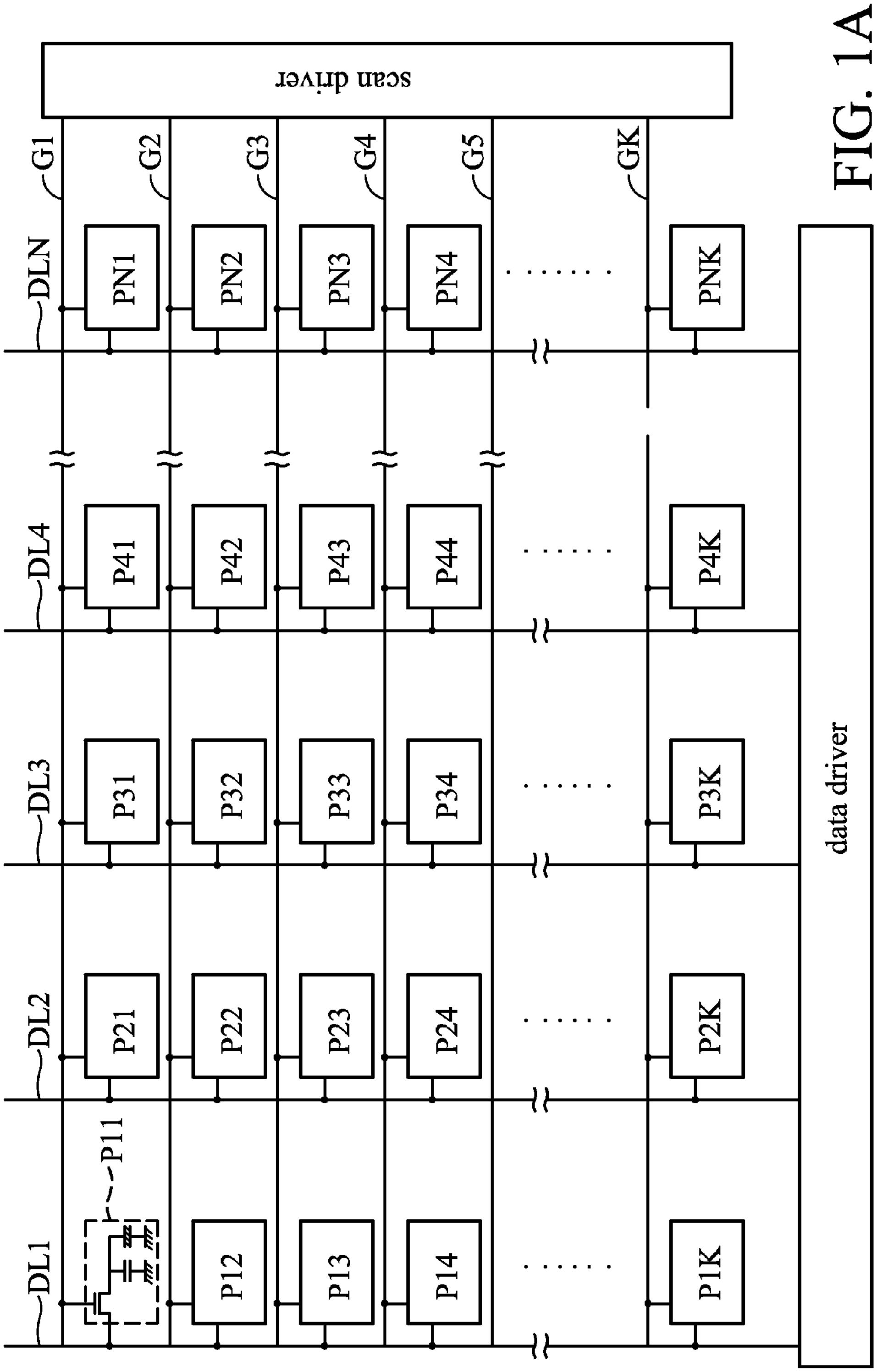
FIG. 1A shows a conventional display panel.
Figure 1B:
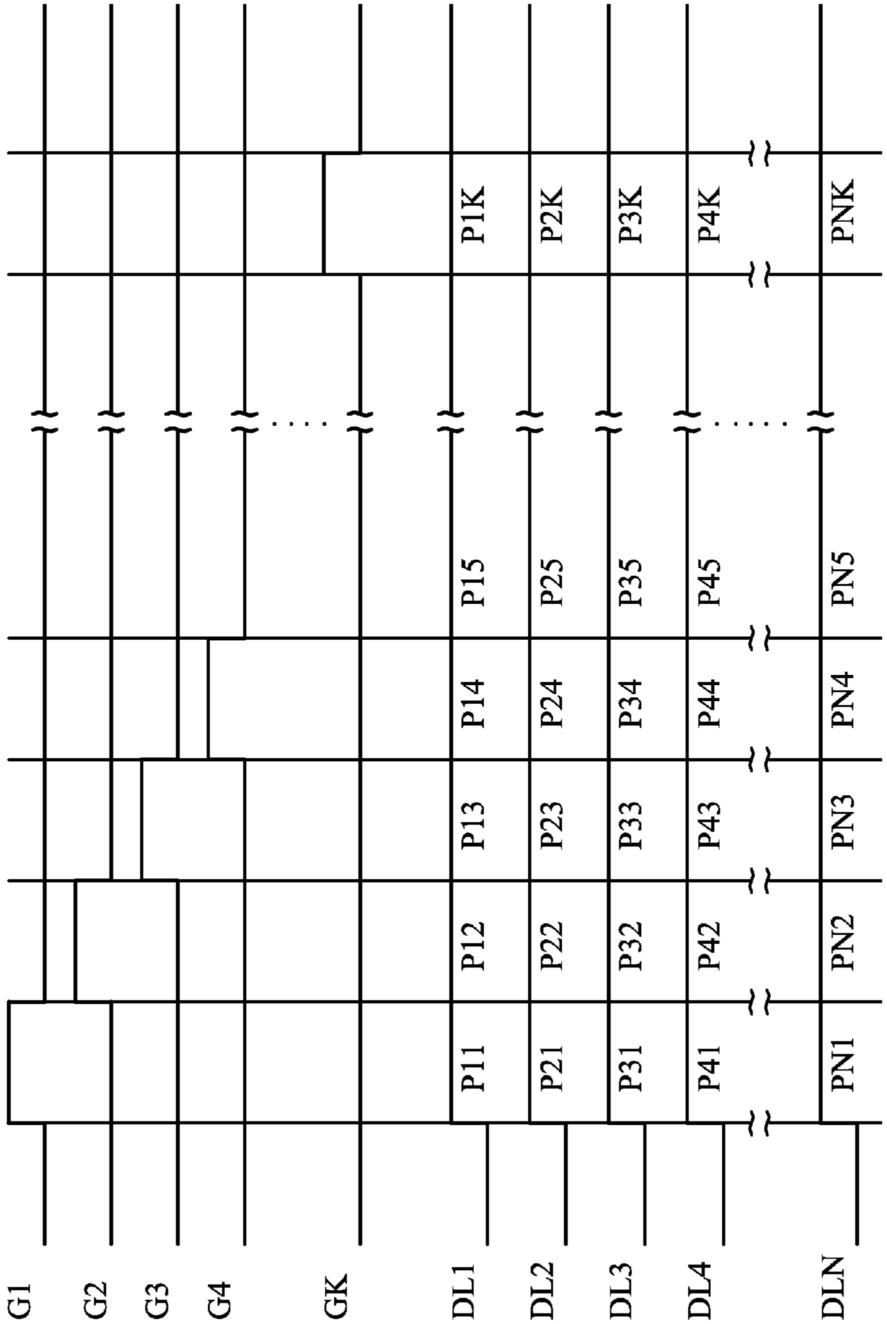
FIG. 1B shows a timing chart of the display panel shown in FIG. 1A.
Figure 2A:
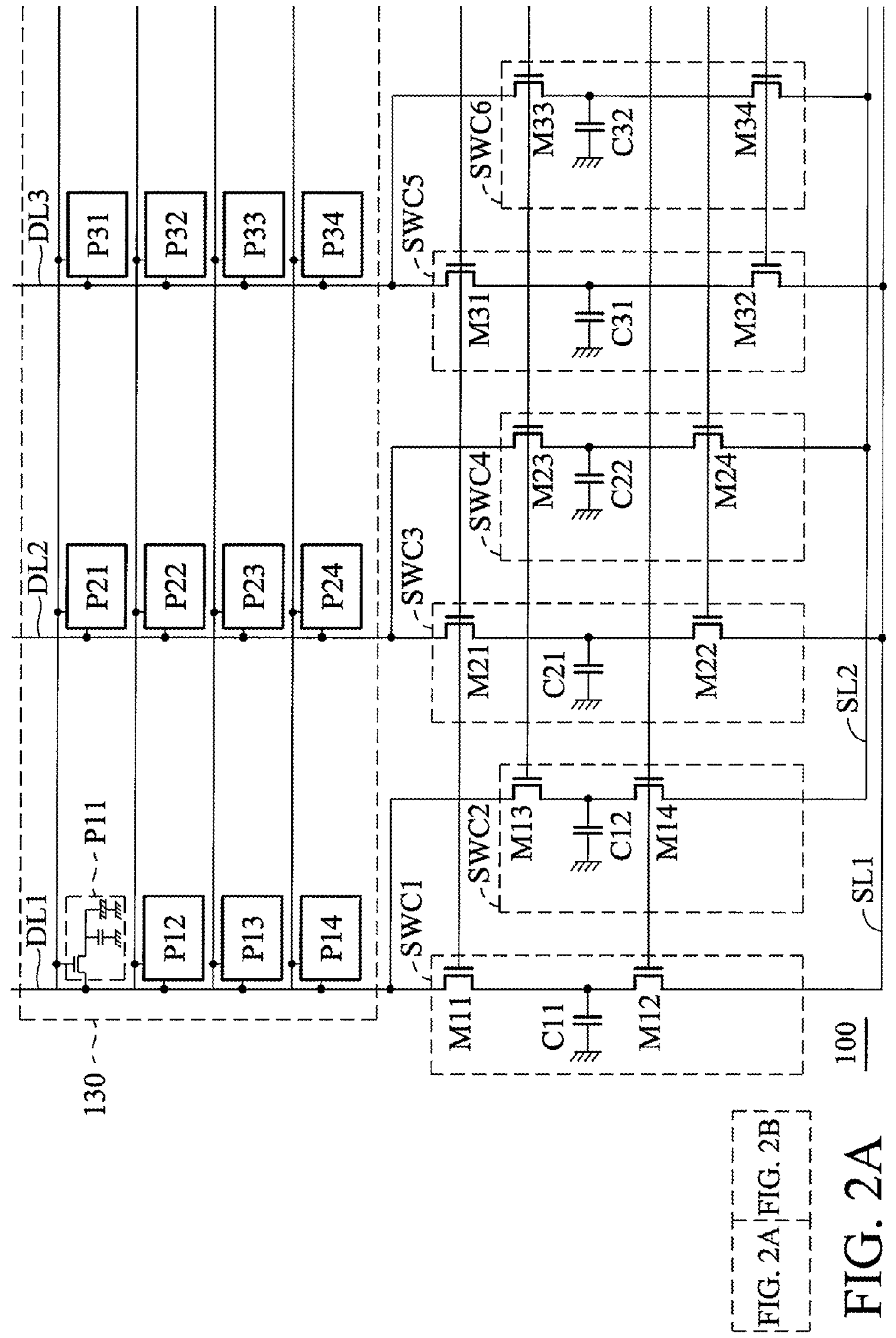
FIG. 2A and FIG. 2B show an embodiment of a display panel.
Figure 2B:
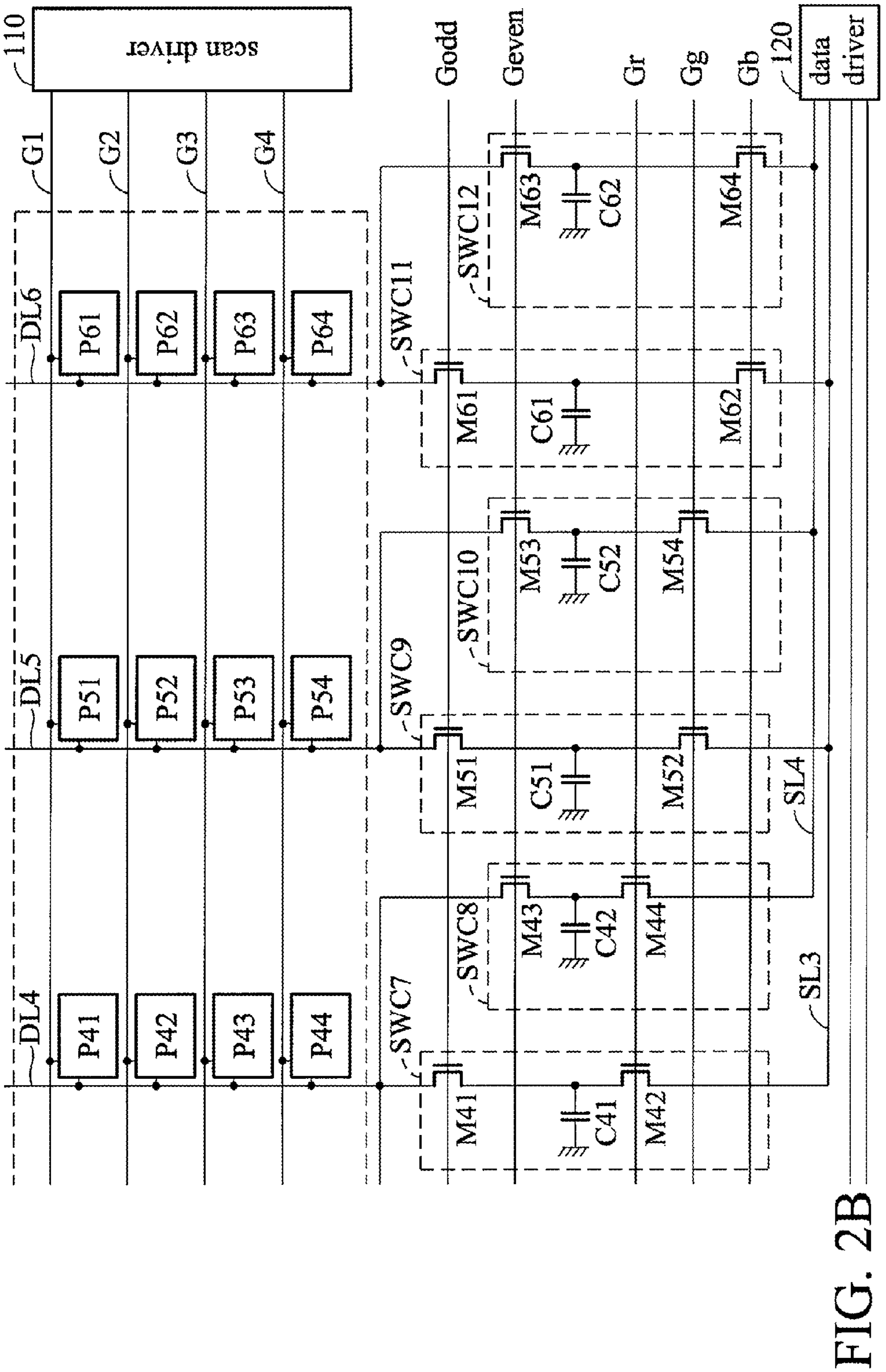

FIG. 2A and FIG. 2B show an embodiment of a display panel. As shown, the display panel 100 comprises a scan driver 110, a data driver, a pixel array 130, and a plurality of signal control circuits SWC1~SWC12. For simplification, the pixel array 130 is a 6×4 pixel array, but can also be a 1024×768 or a 800×600 pixel array.

The scan driver 110, according to control signals from a timing controller (not shown), scans pixel array 130. Namely, the scan driver 110 scans lines G1~G4 in the pixel array 130 in sequence. In this embodiment, the scan driver 110 only scans one of the scan lines G1~G4 during a scan period. The data driver 120 outputs data to the pixel array 130 through signal lines SL1~SL4 according to control signals from the timing controller (not shown).

The pixel array 130 comprises data lines DL1~DL6, scan lines G1~G4, and a plurality of pixel units P11~P64. Each pixel unit comprises a switching element, a storage capacitor, and a liquid capacitor, in which the switching element comprises a control terminal coupled to a corresponding scan line, a first terminal coupled to a corresponding data line, and a second terminal coupled to a corresponding storage capacitor and a corresponding liquid capacitor. Each pixel is coupled to a corresponding data line and a corresponding scan line. For example, the pixel P11 is coupled to a data line DL1 and a scan line G1, the pixel P21 is coupled to a data line DL2 and a scan line G2, and the pixel P31 is coupled to a data line DL3 and a scan line G3, and so on.

The signal control circuits SWC1~SWC12 each comprise a first switching element, a second switching element and a capacitor, each disposed between a data line and a signal line of the data driver. For example, the signal control circuit SWC1 is disposed between the data line DL1 and the signal line SL1, the signal control circuit SWC2 is disposed between the data line DL1 and the signal line SL2 the signal control circuit SWC3 is disposed between the data line DL2 and the signal line SL1 the signal control circuit SWC1 is disposed between the data line DL2 and the signal line SL2, and so on. It should be noted that the first switching elements of the signal control circuits SWC1, SWC3, SWC5, SWC7, SWC9 and SWC11 are coupled to a control signal Godd, and the first switching elements of the signal control circuits SWC2, SWC4, SWC6, SWC8, SWC10 and SWC12 are coupled to a control signal Geven. The second switching elements of the signal control circuits SWC1, SWC2, SWC7 and SWC8 are coupled to a control signal Gr, the second switching elements of the signal control circuits SWC3, SWC4, SWC9 and SWC10 are coupled to a control signal Gg, and the second switching elements of the signal control circuits SWC5, SWC6, SWC11 and SWC12 are coupled to a control signal Gb.

In this embodiment, all switching elements can be formed by low-temperature poly-silicon (LTPS) process or amorphous silicon process, and the data driver 120 can transfer data three times on one signal line SL1 (or SL2) in sequence during a scan period. In the invention, due to operation of the signal control circuits, the data driver can transfer display data required by three data lines through two signal lines.

First Embodiment

Figure 3:
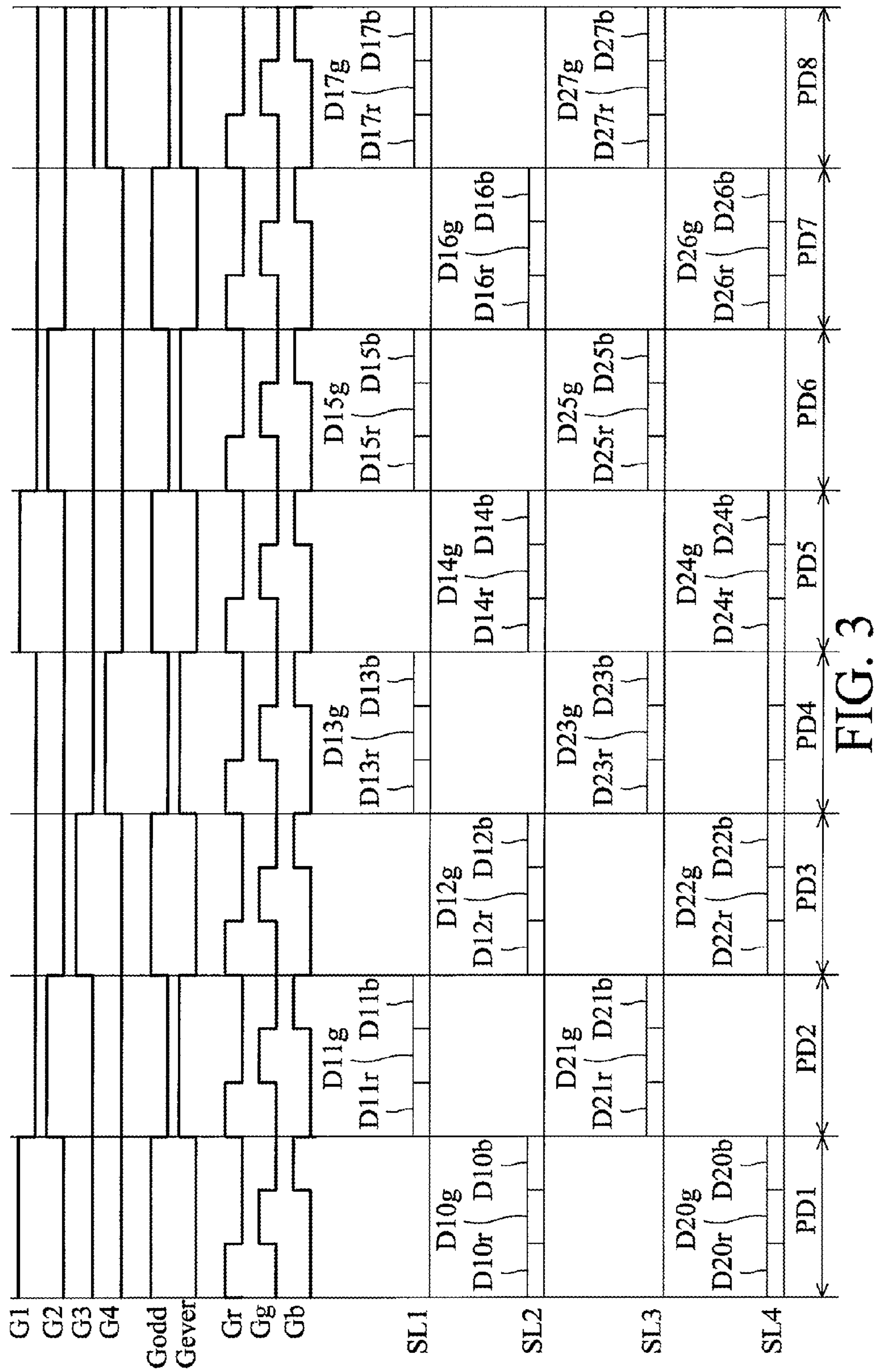
FIG. 3 is a timing chart of the display panel.

FIG. 3 is timing chart of the display panel. Operation of the display panel is disclosed hereafter, with reference to FIGS. 2A and 2B and FIG. 3.

During period PD1, the scan driver 110 scans (asserts) the scan lines G1, the switching elements M11, M21, M31, M41, M51 and M61 are turned on according to the control signal Godd, and the switching elements M13, M23, M33, M43, M53 and M63 are turned off according to the control signal Geven. Because the switching elements M11, M21, M31, M41, M51 and M61 are turned on due to the control signal Godd, the display data previously stored in capacitors C11, C21, C31, C41, C51 and C61 is output to data lines DL1~DL6, driving the pixels P11~P61 connected by the scanned scan line G1.

Further, according to the control signals Gr, Gg and Gb, the data driver 120 outputs display data D10*r*, D10*g*, D10*b*, D20*r*, D20*g* and D20*b* on the signal line SL2 and SL4 in sequence, such that the display data D10*r*, D10*g*, D10*b*, D20*r*, D20*g* and D20*b* is stored in the capacitors C12, C22, C32, C42, C52 and C62 respectively. In particular, when the data driver 120 outputs display data D10*r* and D20*r* on the signal line SL2 and SL4 respectively, the switching elements M14 and M44 are turned on according to the control signal Gr, such that display data D10*r* and D20*r* on the signal lines SL2 and SL4 is stored in the capacitors C12 and C42 respectively. When the data driver 120 outputs display data D10*g* and D20*g* on the signal lines SL2 and SL4 respectively, the switching elements M24 and M54 are turned on according to the control signal Gg, such that display data D10*g* and D20*g* on the signal lines SL2 and SL4 is stored in the capacitors C22 and C52 respectively. When the data driver 120 outputs display data D10*b* and D20*b* on the signal lines SL2 and SL4 respectively, the switching elements M34 and M64 are turned on according to the control signal Gb, such that display data D10*b* and D20*b* on the signal line SL2 and SL4 is stored in the capacitors C32 and C62 respectively. In the period PD1, because the switching elements M13, M23, M33, M43, M53 and M63 are turned off according to the control signal Geven, the display data D10*r*, D10*g*, D10*b*, D20*r*, D20*g* and D20*b* stored in the capacitors C12, C22, C32, C42, C52 and C62 is not output to the data lines DL1~DL6.

During period PD2, the scan driver 110 scans (asserts) the scan lines G2, the switching elements M11, M21, M31, M41, M51 and M61 are turned off according to the control signal Godd, and the switching elements M13, M23, M33, M43, M53 and M63 are turned on according to the control signal Geven. Because the switching elements M13, M23, M33, M43, M53 and M63 are turned on due to the control signal Geven, the display data D10*r*, D10*g*, D10*b*, D20*r*, D20*g* and D20*b* stored in capacitors C12, C22, C32, C42, C52 and C62 in the period PD1 is output to data lines DL1~DL6, driving the pixels P12~P62 connected by the scanned scan line G2.

Further, according to the control signals Gr, Gg and Gb, the data driver 120 outputs display data D11*r*, D11*g*, D11*b*, D21*r*, D21*g* and D21*b* on the signal line SL1 and SL3 in sequence, such that the display data D11*r*, D11*g*, D11*b*, D21*r*, D21*g* and D21*b* is stored in the capacitors C11, C21, C31, C41, C51 and C61 respectively. In particular, when the data driver 120 outputs display data D11*r* and D21*r* on the signal lines SL1 and SL3 respectively, the switching elements M12 and M42 are turned on according to the control signal Gr, such that display data D11*r* and D21*r* on the signal lines SL1 and SL3 is stored in the capacitors C11 and C41 respectively. When the data driver 120 outputs display data D11*g* and D21*g* on the signal lines SL1 and SL3 respectively, the switching elements M22 and M52 are turned on according to the control signal Gg, such that display data D11*g* and D21*g* on the signal lines SL1 and SL3 is stored in the capacitors C21 and C51 respectively.

When the data driver 120 outputs display data D11*b* and D21*b* on the signal lines SL1 and SL3 respectively, the switching elements M32 and M62 are turned on according to the control signal Gb, such that display data D11*b* and D21*b* on the signal lines SL1 and SL3 is stored in the capacitors C31 and C61 respectively. In the period PD2, because the switching elements M11, M21, M31, M41, M51 and M61 are turned off according to the control signal Godd, the display data D11*r*, D11*g*, D11*b*, D21*r*, D21*g* and D21*b* stored in the capacitors C11, C21, C31, C41, C51 and C61 is not output to the data lines DL1~DL6.

Similarly, during period PD3, the display data D11*r*, D11*g*, D11*b*, D21*r*, D21*g* and D21*b* stored in capacitors C11, C21, C31, C41, C51 and C61 in the period PD2 is output to data lines DL1~DL6, driving the pixels P13~P63 connected by the scanned scan line G3. The data driver 120 outputs display data D12*r*, D12*g*, D12*b*, D22*r*, D22*g* and D22*b* on the signal lines SL2 and SL4 in sequence, such that the display data D12*r*, D12*g*, D12*b*, D22*r*, D22*g* and D22*b* is stored in the capacitors C12, C22, C32, C42, C52 and C62 respectively.

During period PD4, the display data D12*r*, D12*g*, D12*b*, D22*r*, D22*g* and D22*b* stored in capacitors C12, C22, C32, C42, C52 and C62 in the period PD2 is output to data lines DL1~DL6, driving the pixels P14~P64 connected by the scanned scan line G4. The data driver 120 outputs display data D13*r*, D13*g*, D13*b*, D23*r*, D23*g* and D23*b* on the signal lines SL1 and SL3 in sequence, such that the display data D13*r*, D13*g*, D13*b*, D23*r*, D23*g* and D23*b* is stored in the capacitors C11, C21, C31, C41, C51 and C61 respectively. Operation of periods PD5~PD8 is similar to that of the periods PD1~PD4 and this is omitted for simplification.

In this embodiment, the data driver stores display data to capacitors in the signal control circuits through a signal line and outputs display data previously stored to corresponding data lines in the pixel array through the other signal line during the same period. Thus, the display panel can transfer display data required by three data lines in the pixel array by two signal lines. Namely, the number of signal lines connected to the data driver can be reduced, as can driving ICs in the data driver accordingly.

Second Embodiment

Figure 4:
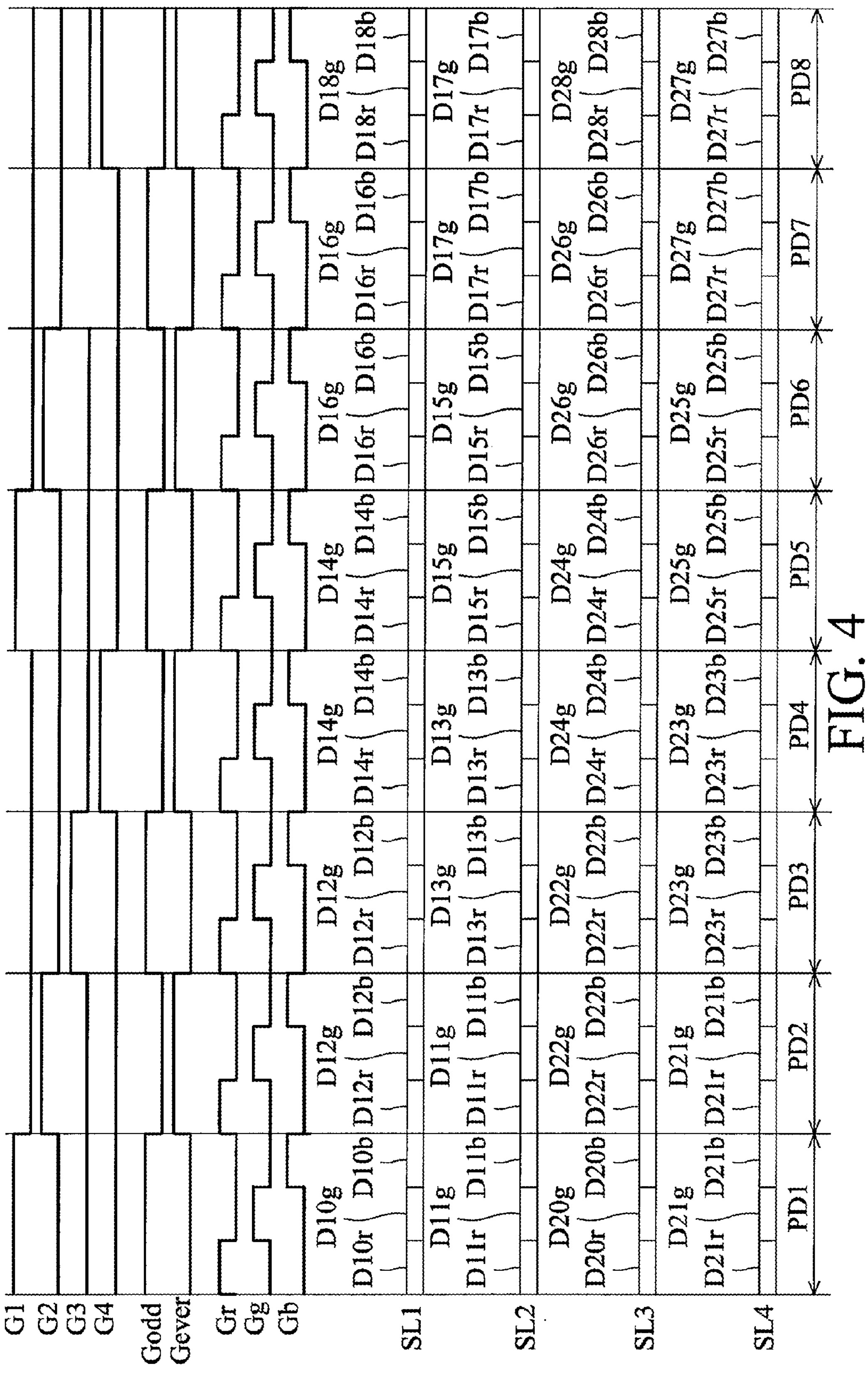
FIG. 4 is another timing chart of the display panel.

FIG. 4 is another timing chart of the display panel. Operation of the display panel is disclosed hereafter, with reference to FIGS. 2A and 2B and FIG. 4.

During period PD1, the scan driver 110 scans (asserts) the scan lines G1, the switching elements M11, M21, M31, M41, M51 and M61 are turned on according to the control signal Godd, and the switching elements M13, M23, M33, M43, M53 and M63 are turned off according to the control signal Geven. The data driver 120, according to the control signals Gr, Gg and Gb, outputs display data D10r, D10g and D10b on the signal line SL1 in sequence, display data D11r, D11g and D11b on the signal line SL2 in sequence, display data D20r, D20g and D20b on the signal line SL3 in sequence, and display data D21r, D21g and D21b on the signal line SL4 in sequence.

In particular, when the data driver 120 outputs display data D10r, D11r, D20r and D21r on the signal lines SL1, SL2, SL3 and SL4 respectively, the switching elements M12 and M42 are turned on according to the control signal Gr, such that the pixel P11 is driven by display data D10r on the signal SL1 and the display data previously stored in the capacitor C11, and the pixel P41 is driven by display data D20r on the signal SL3 and the display data previously stored in the capacitor C41. Meanwhile, because the switching elements M14 and M44 are turned on according to the control signal Gr, display data D11r and D21r on the signal lines SL2 and SL4 are stored in the capacitors C12 and C42 respectively.

When the data driver 120 outputs display data D10g, D11g, D20g and D21g on the signal lines SL1, SL2, SL3 and SL4 respectively, the switching elements M22 and M52 are turned on according to the control signal Gg, such that the pixel P21 is driven by display data D10g on the signal SL1 and the display data previously stored in the capacitor C21, and the pixel P51 is driven by display data D20g on the signal SL3 and the display data previously stored in the capacitor C51. Meanwhile, because the switching elements M24 and M54 are turned on according to the control signal Gg, the display data D11g and D21g on the signal lines SL2 and SL4 are stored in the capacitors C22 and C52 respectively.

When the data driver 120 outputs display data D10b, D11b, D20b and D21b on the signal lines SL1, SL2, SL3 and SL4 respectively, the switching elements M32 and M62 are turned on according to the control signal Gb, such that the pixel P31 is driven by display data D10b on the signal SL1 and the display data previously stored in the capacitor C31, and the pixel P61 is driven by display data D20b on the signal SL3 and the display data previously stored in the capacitor C61. Meanwhile, because the switching elements M34 and M64 are turned on according to the control signal Gb, the display data D11b and D21b on the signal lines SL2 and SL4 are stored in the capacitors C32 and C62 respectively.

During period PD2, the scan driver 110 scans (asserts) the scan lines G2, the switching elements M11, M21, M31, M41, M51 and M61 are turned off according to the control signal Godd, and the switching elements M13, M23, M33, M43, M53 and M63 are turned on according to the control signal Geven. The data driver 120, according to the control signals Gr, Gg and Gb, outputs display data D12r, D12g and D12b on the signal line SL1 in sequence, display data D11r, D11g and D11b on the signal line SL2 in sequence, display data D22r, D22g and D22b on the signal line SL3 in sequence, and display data D21r, D21g and D21b on the signal line SL4 in sequence.

In particular, when the data driver 120 outputs display data D12r, D11r, D22r and D21r on the signal lines SL1, SL2, SL3 and SL4 respectively, the switching elements M14 and M44 are turned on according to the control signal Gr, such that the pixel P12 is driven by display data D11r on the signal SL2 and the display data D11r stored in the capacitor C11 in period PD1, and the pixel P42 is driven by display data D21r on the signal SL4 and the display data D21r stored in the capacitor C42 in the period PD1. Meanwhile, because the switching elements M12 and M42 are turned on according to the control signal Gr, the display data D12r and D22r on the signal lines SL1 and SL3 are stored in the capacitors C11 and C41 respectively.

When the data driver 120 outputs display data D12g, D11g, D22g and D21g on the signal lines SL1, SL2, SL3 and SL4 respectively, the switching elements M24 and M54 are turned on according to the control signal Gg, such that the pixel P22 is driven by display data D12g on the signal SL2 and the display data D12g stored in the capacitor C22 in the period PD1, and the pixel P52 is driven by display data D22g on the signal SL4 and the display data D22g stored in the capacitor C52 in the period PD1. Meanwhile, because the switching elements M22 and M52 are turned on according to the control signal Gg, the display data D12g and D22g on the signal lines SL1 and SL3 are stored in the capacitors C21 and C51 respectively.

When the data driver 120 outputs display data D12b, D11b, D22b and D21b on the signal lines SL1, SL2, SL3 and SL4 respectively, the switching elements M34 and M64 are turned on according to the control signal Gb, such that the pixel P32 is driven by display data D11b on the signal SL2 and the display data D11b stored in the capacitor C32 in the period PD1, and the pixel P61 is driven by display data D21b on the signal SL4 and the display data D21b stored in the capacitor C62 in the period PD1. Meanwhile, because the switching elements M32 and M62 are turned on according to the control signal Gb, the display data D12b and D22b on the signal lines SL1 and SL3 are stored in the capacitors C31 and C61 respectively.

During period PD3, the data driver 120 drives the pixels P13~P63 connected to the scanned scan line G3 by data lines DL1~DL6, according to display data D12r, D12g, D12b, D22r, D22g and D22b on the signal lines SL1 and SL3 and display data D12r, D12g, D12b, D22r, D22g and D22b stored in the capacitors C11, C21, C31, C41, C51 and C61. The data driver 120 further outputs display data D13r, D13g, D13b, D23r, D23g and D23b on the signal lines SL2 and SL4 in sequence to store in the capacitors C12, C22, C32, C42, C52 and C62 respectively.

During period PD4, the data driver 120 drives the pixels P14~P64 connected to the scanned scan line G4 by data lines DL1~DL6, according to display data D13r, D13g, D13b, D23r, D23g and D23b on the signal lines SL2 and SL4 and display data D13r, D13g, D13b, D23r, D23g and D23b stored in the capacitors C12, C22, C32, C42, C52 and C62. The data driver 120 further outputs display data D14r, D14g, D14b, D24r, D24g and D24b on the signal lines SL1 and SL3 in sequence to store in the capacitors C11, C21, C31, C41, C51 and C61 respectively. Operation of periods PD5~PD8 is similar to that of the periods PD1~PD4 and this is omitted for simplification.

In this embodiment, the data driver outputs the same display data on the same signal line in sequence during the continuous two periods, such that the display panel not only keeps the advantages in the first embodiment but also increases charge time of the capacitors in the signal control circuits for preventing voltage distortion.

Third Embodiment

Figure 5:
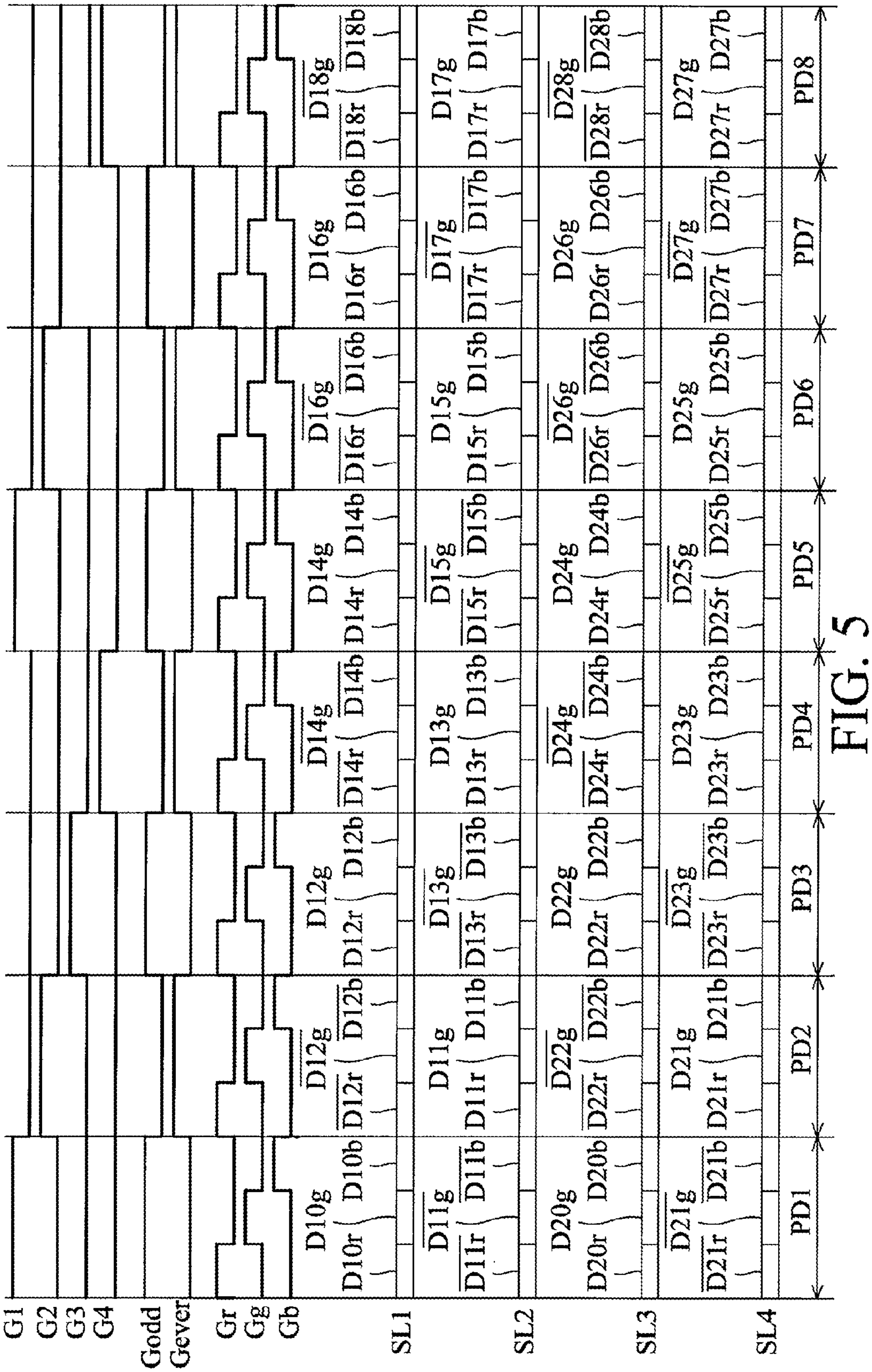
FIG. 5 is another timing chart of the display panel.

FIG. 5 is another timing chart of the display panel. Operation of the display panel is disclosed hereafter, with reference to FIGS. 2A and 2B and FIG. 5.

During period PD1, the scan driver 110 scans (asserts) the scan lines G1, the switching elements M11, M21, M31, M41, M51 and M61 are turned on according to the control signal Godd, and the switching elements M13, M23, M33, M43, M53 and M63 are turned off according to the control signal Geven. The data driver 120, according to the control signals Gr, Gg and Gb, outputs display data D10r, D10g and D10b on the signal line SL1 in sequence, display data $\overline{D11r}$, $\overline{D11g}$ and $\overline{D11b}$ on the signal line SL2 in sequence, display data D20r, D20g and D20b on the signal line SL3 in sequence, and display data $\overline{D21r}$, $\overline{D21g}$ and $\overline{D21b}$ on the signal line SL4 in sequence.

In particular, when the data driver 120 outputs display data D10r, $\overline{D11r}$, D20r and $\overline{D21r}$ on the signal lines SL1, SL2, SL3 and SL4 respectively, the switching elements M12 and M42 are turned on according to the control signal Gr, such that the pixel P11 is driven by display data D10r on the signal SL1 and the display data stored in the capacitor C11 in the previous period, and the pixel P41 is driven by display data D20r on the signal SL3 and the display data stored in the capacitor C41 in the previous period. In the meanwhile, because the switching elements M14 and M44 are turned on according to the control signal Gr, such that the display data $\overline{D11r}$ and $\overline{D21r}$ on the signal lines SL2 and SL4 are stored in the capacitors C12 and C42 respectively.

When the data driver 120 outputs display data D10g, $\overline{D11g}$, D20g and $\overline{D21g}$ on the signal lines SL1, SL2, SL3 and SL4 respectively, the switching elements M22 and M52 are turned on according to the control signal Gg, such that the pixel P21 is driven by display data D10g on the signal SL1 and the display data previous stored in the capacitor C21, and the pixel P51 is driven by display data D20g on the signal SL3 and the display data previously stored in the capacitor C51. Meanwhile, because the switching elements M24 and M54 are turned on according to the control signal Gg, the display data $\overline{D11g}$ and $\overline{D21g}$ on the signal lines SL2 and SL4 are stored in the capacitors C22 and C52 respectively.

When the data driver 120 outputs display data D10b, $\overline{D11b}$, D20b and $\overline{D21b}$ on the signal lines SL1, SL2, SL3 and SL4 respectively, the switching elements M32 and M62 are turned on according to the control signal Gb, such that the pixel P31 is driven by display data D10b on the signal SL1 and the display data previously stored in the capacitor C31, and the pixel P61 is driven by display data D20b on the signal SL3 and the display data previous stored in the capacitor C61. Meanwhile, because the switching elements M34 and M64 are turned on according to the control signal Gb, the display data $\overline{D11b}$ and $\overline{D21b}$ on the signal lines SL2 and SL4 are stored in the capacitors C32 and C62 respectively.

During period PD2, the scan driver 110 scans (asserts) the scan lines G2, the switching elements M11, M21, M31, M41, M51 and M61 are turned off according to the control signal Godd, and the switching elements M13, M23, M33, M43, M53 and M63 are turned on according to the control signal Geven. The data driver 120, according to the control signals Gr, Gg and Gb, outputs pre-charge data $\overline{D12r}$, $\overline{D12g}$ and $\overline{D12b}$ on the signal line SL1 in sequence, display data D11r, D11g and D11b on the signal line SL2 in sequence, pre-charge data $\overline{D22r}$, $\overline{D22g}$ and $\overline{D22b}$ on the signal line SL3 in sequence, and display data D21r, D21g and D21b on the signal line SL4 in sequence.

In particular, when the data driver 120 outputs data $\overline{D12r}$, D11r, $\overline{D22r}$ and D21r on the signal lines SL1, SL2, SL3 and SL4 respectively, the switching elements M14 and M44 are turned on according to the control signal Gr, such that the pixel P12 is driven by display data D11r on the signal SL2 and the pre-charge data $\overline{D11r}$ stored in the capacitor C11 in the period PD1, and the pixel P42 is driven by display data D21r on the signal SL4 and the pre-charge data $\overline{D12r}$ stored in the capacitor C42 in the period PD1. In the meanwhile, because the switching elements M12 and M42 are turned on according to the control signal Gr, such that the pre-charge data $\overline{D12r}$ and $\overline{D22r}$ on the signal lines SL1 and SL3 are stored in the capacitors C11 and C41 respectively.

When the data driver 120 outputs display data $\overline{D12g}$, D11g, $\overline{D22g}$ and D21g on the signal lines SL1, SL2, SL3 and SL4 respectively, the switching elements M24 and M54 are turned on according to the control signal Gg, such that the pixel P22 is driven by display data D12g on the signal SL2 and the pre-charge data $\overline{D11g}$ stored in the capacitor C22 in the period PD1, and the pixel P52 is driven by display data D22g on the signal SL4 and the pre-charge data $\overline{D21g}$ stored in the capacitor C52 in the period PD1. Meanwhile, because the switching elements M22 and M52 are turned on according to the control signal Gg, the display data $\overline{D12g}$ and $\overline{D22g}$ on the signal lines SL1 and SL3 are stored in the capacitors C21 and C51 respectively.

When the data driver 120 outputs display data $\overline{D12b}$, D11b, $\overline{D22b}$ and D21b on the signal lines SL1, SL2, SL3 and SL4 respectively, the switching elements M34 and M64 are turned on according to the control signal Gb, such that the pixel P32 is driven by display data D11b on the signal SL2 and the pre-charge data $\overline{D11b}$ stored in the capacitor C32 in the period PD1, and the pixel P61 is driven by display data D21b on the signal SL4 and the pre-charge data $\overline{D21b}$ stored in the capacitor C62 in the period PD1. Meanwhile, because the switching elements M32 and M62 are turned on according to the control signal Gb, the display data $\overline{D12b}$ and $\overline{D22b}$ on the signal lines SL1 and SL3 are stored in the capacitors C31 and C61 respectively.

During period PD3, the data driver 120 drives the pixels P13~P63 connected to the scanned scan line G3 by data lines DL1~DL6, according to display data D12r, D12g, D12b, D22r, D22g and D22b on the signal lines SL1 and SL3 and pre-charge data $\overline{D12r}$, $\overline{D12g}$, $\overline{D12b}$, $\overline{D22r}$, $\overline{D22g}$ and $\overline{D22b}$ stored in the capacitors C11, C21, C31, C41, C51 and C61. The data driver 120 further outputs pre-charge data $\overline{D13r}$, $\overline{D13g}$, $\overline{D13b}$, $\overline{D23r}$, $\overline{D23g}$ and $\overline{D23b}$ on the signal lines SL2 and SL4 in sequence to store in the capacitors C12, C22, C32, C42, C52 and C62 respectively.

During period PD4, the data driver 120 drives the pixels P14~P64 connected to the scanned scan line G4 by data lines DL1~DL6, according to display data D13r, D13g, D13b, D23r, D23g and D23b on the signal lines SL2 and SL4 and pre-charge data $\overline{D13r}$, $\overline{D13g}$, $\overline{D13b}$, $\overline{D23r}$, $\overline{D23g}$ and $\overline{D23b}$ stored in the capacitors C12, C22, C32, C42, C52 and C62. The data driver 120 further outputs pre-charge data $\overline{D14r}$, $\overline{D14g}$, $\overline{D14b}$, $\overline{D24r}$, $\overline{D24g}$ and $\overline{D24b}$ on the signal lines SL1 and SL3 in sequence to store in the capacitors C11, C21, C31, C41, C51 and C61 respectively. Operation of period PD5~PD8 is similar to that of the period PD1~PD4 and this is omitted for simplification.

In this embodiment, the data driver outputs pre-charge data corresponding to the required display data for the next period to store in the capacitors during one period and outputs the required display data to drive pixels with the stored pre-charge data during the next period. The pre-charge data can be overdriven voltages corresponding to the required display data. For example, when display data is a voltage signal of 3V, the overdriven voltage signal can be a voltage signal multiplied by a predetermined parameter, such as 3.3V voltage signal. Thus, the display panel not only keeps the advantages of the first and embodiments but also increases voltage level of pre-charge to prevent insufficient charging time.

In the display panels of the invention, each two signal lines of the data driver can drive three data lines in the pixel array, the driving ICs in the data driver are reduced. Thus, time spent bonding the driving ICs to the FPC board and the FPC board to the display panel is increased during fabrication.

In the three embodiments, for display images, two signal lines are used to transfer data required by three data lines in pixel array according to three control signals Gr, Gg and Gb, but it is to be understood that the invention is not limited thereto. The invention also can use two signal lines with four control signals to transfer data for four data lines, two signal lines with five control signals to transfer data for fifth data lines, two signal lines with six control signals to transfer data for sixth data lines, and so on. Namely, the invention employs two signal lines to transfer data required by N data lines in pixel array according to N control signals for display images. In a case of A×B pixel array, N>2 and is a positive integer, such as 3, 4, 5, and so on, but $$N < \frac{A}{2}.$$

In the three embodiments, each signal line and three control signals, such as Gr, Gg and Gb, operate in coordination to gather display data during an operating period. Namely, in these embodiments, while each signal line can transfer three display data during one operating period, it is to be understood that the invention is not limited thereto. Each signal line can also transfer 3×M display data, in which M is 1, 2, 3, 4, 5 . . . and so on. Namely, the scan frequency during one operation period can be increased.

Figure 6:
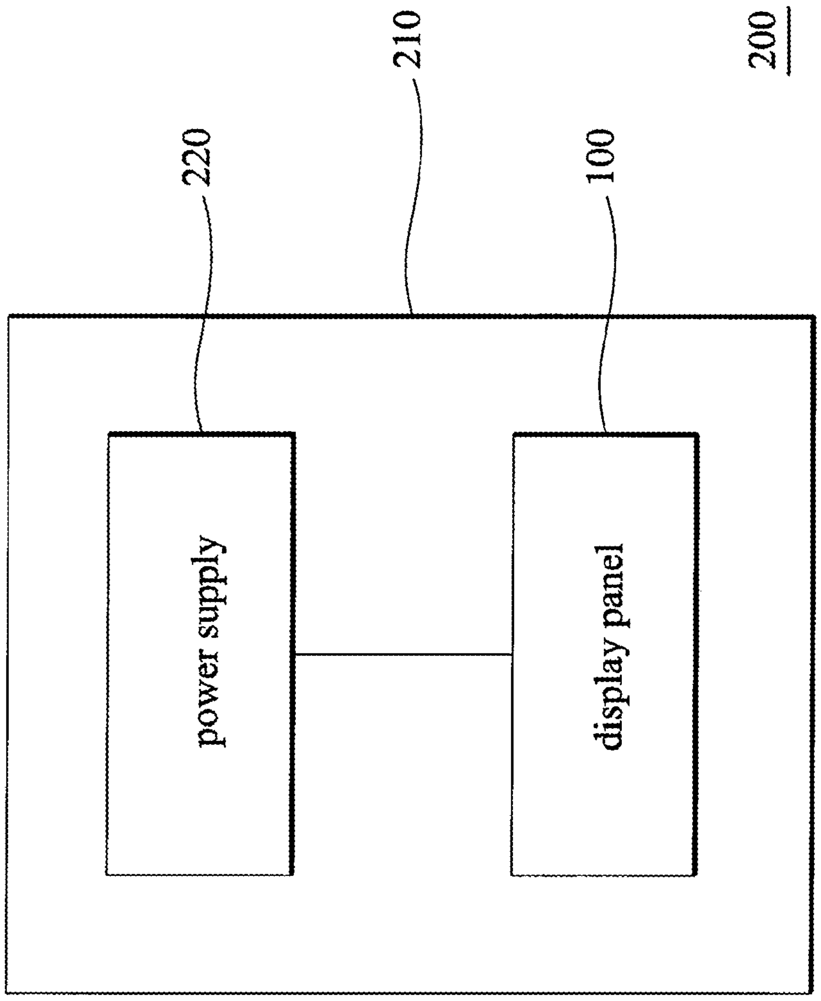
FIG. 6 schematically shows an embodiment of an electronic device.

FIG. 6 schematically shows an embodiment of an electronic device 600, employing display panel 100 shown in FIGS. 2A and 2B. The electronic device 600 may be a device such as a PDA, notebook computer, tablet computer, cellular phone or a display monitor device, for example.

Electronic device 200 comprises a housing 210, a display panel 100 and a power supply 220, although it is to be understood that various other components can be included, such components not shown or described here for ease of illustration and description. In operation, the power supply 220 powers the display panel 100 so that the display panel 100 can display color images.

While the invention has been described by way of example and in terms of the preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for driving a display panel, comprising:

transferring a first set of data stored in N first storage capacitors in a M−1$^{th}$ period to N corresponding first pixels through N data lines, so as to drive the N corresponding first pixels, and storing a second set of data on a second signal line from a data driver to N second storage capacitors, during an M$^{th}$ period;

transferring the second set of data stored in the N second storage capacitors to N corresponding second pixels through the N data lines, so as to drive the N corresponding second pixels, and storing a third set of data on a first signal line from the data driver to the N first storage capacitors, during an M+1$^{th}$ period; and transferring a fourth set of data on the first signal line from the data driver to N first storage capacitors through the N data lines, such that the N corresponding first pixels are driven by the first and fourth sets of data, during the M$^{th}$ period;

wherein the first signal line is different from the second signal line;

wherein the second set of data on the second signal line is stored in the N second storage capacitors in sequence during the M$^{th}$ period, and wherein the third set of data on the first signal line is stored in the N first storage capacitors in sequence during the M+1$^{th}$ period; and wherein M and N are integers larger than 2.

2. The driving method as claimed in claim 1, wherein the first, the second, and the third sets of data comprises display data.

3. The driving method as claimed in claim 1, further comprising transferring a fifth set of data on the second signal line from the data driver to N second storage capacitors through the N data lines, such that the N corresponding second pixels are driven by the second and fifth sets of data, during the M+1$^{th}$ period.

4. The driving method as claimed in claim 3, wherein the fourth set of data on the first signal line is transferred to the N corresponding first pixels in sequence during the M$^{th}$ period, and the fifth set of signal on the second data line is transferred to the N corresponding second pixels in sequence during the M+1$^{th}$ period.

5. The driving method as claimed in claim 4, wherein the first and fourth sets of data comprise the same display data, and the second and fifth sets of data comprise the same display data.

6. The driving method as claimed in claim 4, wherein the fourth and fifth sets of data comprise display data, the first set of data comprises a set of overdriven voltage signals corresponding to the fourth set of data, and the second set of data comprises a set of overdriven voltage signals corresponding to the fifth set of data.

* * * * *